3,071,624
SULFIDE CLEAVAGE
Robert J. Laufer, Pittsburgh, Pa., assignor to Consolidation Coal Company, Pittsburgh, Pa., a corporation of Pennsylvania
No Drawing. Filed Mar. 8, 1961, Ser. No. 94,163
15 Claims. (Cl. 260—609)

This invention relates to the sulfide cleavage of alkyl aryl sulfides. More specifically, it relates to the splitting off of a branched-chain alkyl group attached to the sulfur atom of an alkyl aryl sulfide in the presence of specific sulfide cleavage acid catalysts.

The term "branched-chain alkyl" as used herein refers to an alkyl group whose attaching carbon atom is a secondary or tertiary carbon atom. In C-alkylated thiophenols, the carbon atom of this alkyl group is attached to a nuclear carbon atom (ring). In S-alkylated thiophenols, the carbon atom of the alkyl group is attached to the sulfur atom (sulfide).

The preparation of ring-alkylated thiophenols substituted in the para position of the ring with a t-alkyl group has been described in copending applications Serial Nos. 70,413, 70,405, and 70,443, all filed November 21, 1960, and assigned to the assignee of this invention. The preparation of ring-alkylated thiophenols alkylated in the ortho position of the ring with a sec-alkyl group has been described in copending application Serial Nos. 70,424, 70,404, and 70,425, all filed November 21, 1960, and assigned to the assignee of this invention. In the foregoing processes for preparing ring-alkylated thiophenols, varying amounts of S-alkylated thiophenols, i.e., alkyl aryl sulfides are produced. Sulfide cleavage is of utility in regenerating the starting thiophenol from the sulfide for recycle in the process for ring-alkylating thiophenols. This invention is of further utility as a step in accomplishing the hitherto unknown separation and recovery of individual thiocresol isomers from mixed thiocresols, as shown in copending application Serial No. 70,657, filed November 21, 1960. In this isomer separation process, a mixture of thiocresol isomers is catalytically reacted with a t-alkyl-generating olefin, only the orthothiocresol isomer being alkylatable in the ring. The meta- and para-thiocresols form their t-alkyl sulfides. This invention provides the means for separately recovering both meta- and parathiocresols by individual sulfide cleavage of their respective t-alkyl sulfides.

In marked contrast to the alkyl aryl ethers, e.g., anisole, isopropyl phenyl ether, etc., where side-chain carbon-oxygen cleavage readily occurs, in alkyl aryl sulfides the side-chain carbon-sulfur bond is cleaved with considerable difficulty. A reductive sulfide cleavage of alkyl aryl sulfides is known wherein a primary group, e.g., methyl, may be removed from a compound such as thioanisole by using a reducing agent, e.g., an alkali metal dissolved in a nitrogenous solvent. Exemplary reducing agents are sodium-liquid ammonia, sodium-pyridine, and lithium-methylamine. The temperature at which these reducing agents are employed is generally determined by the boiling point of the solvent; e.g., sodium-liquid ammonia is generally used at $-33°$ C., the atmospheric boiling point of ammonia; pyridine is used at 115° C., its reflux temperature, etc. These reducing agents are basic in nature and operate by a different mechanism from the specific acid catalysts that characterize this invention in that hydrogenolytic cleavage occurs with these basic reducing agents. Thus when a t-butyl group is cleaved in the presence of sodium-liquid ammonia, isobutylene is not formed, but rather butanes and octanes primarily. These basic reducing agents are not ordinarily as desirable for use as the specific acid catalysts of this invention because the olefins ordinarily derivable from the cleaved alkyl groups are not recoverable as such. Further, the use of these alkali metal-solvent pairs is less convenient compared with use of the catalysts of this invention. Also, the alkali metal-solvent pairs may adversely affect other groups present on the ring, such as halogen.

Experiments have also been reported [D. S. Tarbell and D. P. Harnish, J. Am. Chem. Soc. 74, 1862 (1952)] intended to elucidate a mechanism of cleavage of the carbon-sulfur bond in various phenyl alkyl and phenyl aralkyl sulfides. Aluminum bromide in chlorobenzene, aqueous hydrobromic acid, and hydrogen bromide in acetic acid solution were among the systems studied. The results obtained, characterized by poor yields and thiophenol degradation, emphasize the difficulties involved in obtaining an effective cleavage process of commercial interest.

Accordingly, it is an object of the present invention to provide a method for the effective sulfide cleavage of branched-chain S-alkylated thiophenols.

It is a further object to provide a method for effectively cleaving a t-alkyl group attached to the sulfur atom of a t-alkyl aryl sulfide.

It is another object to provide a method for effectively cleaving a sec-alkyl group attached to the sulfur atom of a sec-alkyl aryl sulfide.

It is yet a further object to provide a sulfide cleavage process for cleaving branched-chain S-alkylated thiophenols in high yield and in high purity.

It is still a further object to provide a sulfide cleavage process of commercial utility wherein both thiophenols and olefins are recovered from corresponding S-alkylated thiophenols in high yield and in high purity.

In accordance with this invention, sulfide cleavage of a branched-chain alkyl aryl sulfide is accomplished by reacting the sulfide in the presence of a selected sulfide cleavage acid catalyst selected from the class consisting of anhydrous zinc chloride, anhydrous aluminum phosphate, aluminum phenoxides, and aluminum thiophenoxides at a selected sulfide cleavage temperature between about 100° and 400° C. Preferred aluminum phenoxides are selected from the aluminum salts of phenol, cresols, and xylenols. Preferred aluminum thiophenoxides are selected from the aluminum salts of thiophenol, thiocresols, and thioxylenols.

The sulfide cleavage of S-alkylated thiophenols specifically includes the removal of a t-alkyl or sec-alkyl group attached to the sulfur atom. Removal of a sec-alkyl group is more difficult to accomplish than removal of a t-alkyl group and generally requires a higher temperature for effective cleavage. The removal of a t-alkyl group is preferably accomplished at a temperature between 125 and 250° C. The removal of a sec-alkyl group is preferably accomplished at a temperature between 250 and 350° C. At too low a temperature, cleavage is essentially ineffectual; at too high a temperature, undesired side products are formed due to degradation and polymerization.

While catalyst concentration is not critical per se, since heterogeneous catalysis is involved too low a catalyst concentration results in a marked increase in reaction time. Catalyst concentrations of from 1 to 20 percent by weight are preferred. Depending upon the alkyl group to be removed, the reaction temperature used, and the catalyst concentration present, reaction times for liquid phase reactions ranging from 10 minutes to 12 hours are suitable, lower temperatures requiring longer reaction times. Preferred branched-chain alkyl substituents attached to the sulfur atom include from 3 to 16 carbon atoms. Using the catalysts of this invention, it has been found that the cleavage of a higher molecular weight branched-chain alkyl substituent such as sec-butyl proceeds in the same manner and with at least equal effectiveness compared with the cleavage of alkyl groups of lower molecular weight such as isopropyl.

The choice of catalyst is a significant factor in achieving sulfide cleavage in yields of practical significance and of commercial utility. A successful catalyst for accomplishing sulfide cleavage must actively and selectively remove the t-alkyl or sec-alkyl group attached to the sulfur atom without causing (a) desulfurization of the S-alkylated thiophenol or the cleaved product or (b) significant polymerization of the cleaved products. Thus the evolved olefin should be recoverable as such for reuse in the process. It is further desirable that the catalyst be relatively inexpensive or have a sufficiently long life with respect to its catalytic activity. It should also be chemically stable and inert with respect to the various reactants and reaction products, particularly because of the elevated temperatures generally required for effective sulfide cleavage.

The acid catalysts of this invention which are active and selective for the sulfide cleavage of S-alkylated thiophenols and yet do not degrade the thiophenol are selected from the class consisting of anhydrous zinc chloride, anhydrous aluminum phosphate, aluminum phenoxides, and aluminum thiophenoxides. Preferred aluminum phenoxides are selected from the aluminum salts of phenol, cresols, and xylenols. Preferred aluminum thiophenoxides are selected from the aluminum salts of thiophenol, thiocresols, and thioxylenols. Aluminum salts of phenols are known to the art and are readily prepared by a simple direct reaction between granular aluminum and a phenol. The preparation of aluminum thiophenoxides is shown in my copending application Serial No. 747,589, filed July 10, 1958, and assigned to the assignee of this invention. As shown therein, these latter salts may be prepared by a direct reaction between aluminum and a thiophenol under pressurized conditions and at elevated temperatures, ca. 300° C. Preferably, they are prepared by prior amalgamation of granular aluminum and reaction of the amalgamated aluminum at atmospheric pressure with the thiophenol at a temperature between 100 and 150° C.

The sulfide cleavage catalysts of this invention differ among themselves with respect to being able to function also as ring dealkylation catalysts in removing a branched-chain alkyl group that is attached to a nuclear carbon atom of the thiophenol. Thus it has been found that anhydrous zinc chloride and anhydrous aluminum phosphate are also effective for accomplishing substantial ring dealkylation, where the same type of branched alkyl substituents are involved. On the other hand, the aluminum phenoxide and aluminum thiophenoxide catalysts of this invention are not significantly effective in this regard. Thus in practicing the present process, the selection of catalyst to be used will be additionally governed by whether it is desired to accomplish both sulfide cleavage and ring dealkylation in the same operation, the sulfide cleavage occurring at a lower temperature followed by increased ring dealkylation as the temperature is increased. For this combined dealkylation-cleavage, the catalyst used will be selected from zinc chloride and aluminum phosphate. Compounds such as t-butyl 4-t-butyl-o-tolyl sulfide or isopropyl 2-isopropylphenyl sulfide may be converted by such a combined sulfide cleavage and ring dealkylation process to o-thiocresol and isobutylene or to 2-isopropylthiophenol and propylene, respectively. However, for other reactions because of the possible formation of undesired side products, it will be preferred to separately ring dealkylate C-alkylated thiophenols and separately sulfide cleave S-alkylated thiophenols. Thus the S-alkyl group would first be cleaved from the sulfur atom, forming the C-alkylthiophenol. The latter compound would then be isolated and ring dealkylated. For these other reactions, use of aluminum phenoxide and aluminum thiophenoxide catalysts will insure that essentially only sulfide cleavage occurs.

The reactions that occur are relatively complex, and for certain compounds mechanistically may involve disproportionation, isomerization and desulfurization, as well as the desired sulfide cleavage. However, it has been found that by using the process of this invention in conjunction with a relatively simple distillation technique, high yields of thiophenol obtained by sulfide cleavage of the alkyl aryl sulfide may be obtained wholly independent of the possible interim formation of undesired side products. In such a technique, the sulfide is heated in the presence of a catalyst to a desired sulfide cleavage temperature. The column temperature and pressure are coordinately controlled so that the only product that escapes (other than the evolved olefins) is the desired thiophenol, which will be lower boiling than the starting S-alkylated reactant. Any S-alkylated reactant is returned to the distillation vessel by reflux. It has been found that a packed distillation column provides a desired scrubbing action so that the evolved thiophenol is obtained in a high degree of purity, other products being returned to the vessel for reflux. It is also apparent that in removing the cleaved thiophenolic product by this technique, equilibrium is not attained, the reaction being shifted toward formation of additional thiophenol.

It has also been found advantageous in certain instances, particularly in cleaving the more difficultly cleavable sec-alkyl aryl sulfides, to incorporate an inert hydrocarbon oil, e.g., a high boiling paraffin oil, to increase the temperature in the reaction vessel. Thereby these sulfides may be cleaved at temperatures above their atmospheric boiling point. Also, improvements in conversion and yield in certain instances result.

The following examples are intended as illustrative and expository of the invention, and are not to be considered as limitations thereof. All percentage yields shown of recovered products represent mole percent based on converted sulfide.

EXAMPLE 1

Sulfide Cleavage of t-Butyl m-Tolyl Sulfide (Batch Reactor)

Following the procedure shown in my joint copending application Serial No. 70,657, filed November 21, 1960, wherein mixed thiocresols were selectively reacted with isobutylene and the recovered t-butyl tolyl sulfides were subjected to fine fractionation, a sample consisting essentially of t-butyl m-tolyl sulfide was recovered. This sample was charged to a distilling flask along with 10 percent by weight of anhydrous zinc chloride, and the flask was then placed on a distilling column. The mixture was heated at a reaction temperature between 166 and 180° C. for 105 minutes. Both the column temperature and the reflux ratio were adjusted so as to return unreacted material to the reactor, thereby promoting conversion to the final desired product. Product distillate was redistilled prior to analysis. Eighty-nine percent of the t-butyl m-tolyl sulfide was converted, a yield of m-thiocresol of 85 percent being obtained.

EXAMPLE 2

Sulfide Cleavage of t-Butyl Phenyl Sulfide (a) ALUMINUM THIOPHENOXIDE CATALYST t-Butyl phenyl sulfide, 250 grams, was reacted in the presence of 14 percent by weight of aluminum thiophenoxide following the procedure shown in Example 1. The aluminum thiophenoxide was prepared by prior amalgamation of the aluminum by treatment with mercuric chloride followed by reaction of the amalgamated aluminum with thiophenol at a temperature of about 120° C. The sulfide and catalyst were maintained at a reaction temperature of 180–190° C. for 2 hours under atmospheric reflux. All of the t-butyl phenyl sulfide was converted. Yields of 92 percent of thiophenol and 95 percent of isobutylene were obtained.

(b) ALUMINUM o-CRESOXIDE CATALYST

In a similar run, 166 grams of t-butyl phenyl sulfide was reacted in the presence of 16 percent by weight of aluminum o-cresoxide, a stoichiometric excess of o-cresol being used to prepare the catalyst. Atmospheric reflux conditions were maintained at a temperature between 195 and 197° C. for seven hours. Ninety-one percent of the sulfide was converted, yields of 94 percent of thiophenol and 65 percent of isobutylene being obtained.

(c) ALUMINUM PHOSPHATE CATALYST

Two hundred grams of t-butyl phenyl sulfide and 20 grams of anhydrous aluminum phosphate (aluminum salt of orthophosphoric acid) were heated at 174–188° C. for 32 minutes. The isobutylene and thiophenol that were formed were removed by distillation through a packed column. Unreacted sulfide was then recovered by distillation at reduced pressure. The sulfide conversion was 90.6 percent, thiophenol being obtained in a yield of 95.5 percent.

EXAMPLE 3

*Sulfide Cleavage of t-Nonyl Phenyl Sulfide* t-Nonyl phenyl sulfide, 114 grams, was reacted in the presence of 13 percent by weight of aluminum thiophenoxide under atmospheric reflux conditions at a temperature between 158 and 180° C. for 2.5 hours. All of the sulfide was converted, yields of 88 percent of thiophenol and 92 percent of nonene being obtained.

EXAMPLE 4

*Sulfide Cleavage of t-Nonyl 4-t-Nonyl Phenyl Sulfide*

One gram mole (363 grams) of t-nonyl 4-t-nonylphenyl sulfide was reacted in the presence of 9 percent by weight of aluminum o-cresoxide as catalyst. The reaction was performed under atmospheric reflux conditions at a temperature between 326 and 338° C. for approximately three-quarters of an hour. About 85 percent of the sulfide was converted, 49 percent of nonylthiophenol and 25 percent of nonene being obtained. The purity of the nonylthiophenol was 92 percent by titration (89 percent by infrared).

EXAMPLE 5

*Sulfide Cleavage of t-Butyl 4-Chlorophenyl Sulfide*

Fifty grams of t-Butyl 4-chlorophenyl sulfide was reacted in the presence of 14 percent by weight of aluminum thiophenoxide under atmospheric reflux conditions at a temperature ranging from 156 to 204° C. for 4.5 hours, following the procedure shown in Example 1. Sixty-eight percent of the sulfide was converted, 98 percent of 4-chlorothiophenol and 88 percent of isobutylene being obtained.

EXAMPLE 6

*Sulfide Cleavage of Isopropyl Phenyl Sulfide (Batch Reactor)*

A sample of isopropyl phenyl sulfide and 15 percent by weight of anhydrous zinc chloride were charged to a distilling flask which was then placed on a packed distilling column. The reaction vessel temperature was maintained at a temperature between 211 and 323° C. for approximately 3 hours. The column temperature was concomitantly regulated so that the ultimate reaction product, thiophenol, was taken overhead with sufficient reflux so as to return unreacted isopropyl phenyl sulfide to the reaction vessel, propylene passing through the condenser. A high-boiling paraffin oil was included in the reactor to permit operation at temperatures above the atmospheric boiling point of the isopropyl phenyl sulfide. A 31 percent conversion of sulfide occurred, thiophenol being recovered in a yield of 54 percent.

EXAMPLE 7

*Sulfide Cleavage of Isopropyl Phenyl Sulfide (Stirred Reactor)*

(a) ZINC CHLORIDE CATALYST

The procedure and apparatus described above with respect to Example 6 were employed, with the reactor being additionally fitted with an all-glass paddle stirrer to improve contacting of the reactants with the catalyst and to aid in heat transfer between the walls of the reactor and reaction mixture. A high-boiling paraffin oil was also included in the reactor to permit operation at temperatures above the atmospheric boiling point of the isopropyl phenyl sulfide. A continuous feed of isopropyl phenyl sulfide was used, 21 percent by weight of anhydrous zinc chloride being employed as catalyst. The reaction was conducted at a temperature between 296 and 314° C. for approximately 3 hours. Sixty-seven percent of the isopropyl phenyl sulfide was converted. A yield of 76 percent of thiophenol was obtained.

(b) ALUMINUM PHOSPHATE CATALYST

Following the foregoing procedure, to a stirred slurry of 150 grams of paraffin oil and 20 grams of anhydrous aluminum phosphate maintained at a temperature of 300–332° C., 159.5 grams of isopropyl phenyl sulfide was added continuously over a period of 3 hours. The products obtained were recovered through a packed column. A sulfide conversion of 69.5 percent occurred, thiophenol being obtained in a yield of 93.2 percent.

It will of course be readily apparent that many different variants of the process of this invention may be employed depending upon the sulfide being cleaved and the specific reaction parameters used such as catalyst concentration, reaction temperature, time of reaction, and the like. Also a batch technique or a semi-continuous or continuous process may be employed. These variants are considered as falling within the scope of this invention, which should be determined in accordance with the objects and claims thereof.

I claim:

1. The process for sulfide cleaving an alkyl aryl sulfide containing a branched-chain alkyl group attached to the sulfur atom which comprises heating said sulfide at a temperature between about 100 and 400° C. in the presence of a less than stoichiometric catalytic amount of between 1 and 20 percent by weight of a sulfide cleavage acid catalyst selected from the class consisting of anhydrous zinc chloride, anhydrous aluminum phosphate, aluminum phenoxides and aluminum thiophenoxides to form the corresponding thiophenol and an olefin corresponding to said branched-chain alkyl group.

2. The process according to claim 1 wherein said catalyst is anhydrous zinc chloride.

3. The process according to claim 1 wherein said catalyst is anhydrous aluminum phosphate.

4. The process according to claim 1 wherein said catalyst is an aluminum phenoxide.

5. The process according to claim 1 wherein said catalyst is an aluminum thiophenoxide.

6. The process for sulfide cleaving an alkyl aryl sulfide containing a branched-chain alkyl group attached to the sulfur atom to form a lower boiling thiophenol in high yield which comprises heating said sulfide at a temperature between about 100 and 400° C. in the presence of a less than stoichiometric catalytic amount of between 1 and 20 percent by weight of a sulfide cleavage acid catalyst selected from the class consisting of anhydrous zinc chloride, anhydrous aluminum phosphate, aluminum phenoxides, and aluminum thiophenoxides to form said lower boiling thiophenol and an olefin corresponding to said branched-chain alkyl group, and recovering at least the lower boiling thiophenol in high yield.

7. The process for sulfide cleaving an alkyl aryl sulfide containing a t-alkyl group attached to the sulfur atom which comprises heating said sulfide in the presence of a less than stoichiometric catalytic amount of between 1 and 20 percent by weight of a sulfide cleavage acid catalyst selected from the class consisting of anhydrous zinc chloride, anhydrous aluminum phosphate, aluminum phenoxides, and aluminum thiophenoxides, at a temperature between 125 and 250° C. to form the corresponding thiophenol and an olefin corresponding to said t-alkyl group.

8. The process according to claim 7 wherein said catalyst is anhydrous zinc chloride.

9. The process according to claim 7 wherein said catalyst is anhydrous aluminum phosphate.

10. The process for sulfide cleaving an alkyl aryl sulfide containing a sec-alkyl group attached to the sulfur atom which comprises heating said sulfide in the presence of a less than stoichiometric catalytic amount of between 1 and 20 percent by weight of anhydrous zinc chloride at a temperature between 250 and 350° C. to form the corresponding thiophenol and an olefin corresponding to said sec-alkyl group.

11. The process for sulfide cleaving an alkyl aryl sulfide containing a sec-alkyl group attached to the sulfur atom which comprsies heating said sulfide in the presence of a less than stoichiometric catalytic amount of between 1 and 20 percent by weight of anhydrous aluminum phosphate at a temperature between 250 and 350° C. to form the corresponding thiophenol and an olefin corresponding to said sec-alkyl group.

12. The process for sulfide cleaving an alkyl aryl sulfide containing a branched-chain alkyl group attached to the sulfur atom to form a lower boiling thiophenol in high yield, which comprises charging the sulfide and a less than stoichiometric catalytic amount of between 1 and 20 percent by weight of a sulfide cleavage acid catalyst selected from the class consisting of anhydrous zinc chloride, anhydrous aluminum phosphate, aluminum phenoxides, and aluminum thiophenoxides to a distillation apparatus including a reaction vessel and a distillation column, heating said sulfide at a cleavage temperature between about 100 and 400° C. under reflux conditions to form said lower boiling thiophenol and an olefin corresponding to said branched-chain alkyl group, maintaining the vessel and the column at a selected temperature so that unreacted sulfide is returned to the reaction vessel and said olefin and lower boiling formed thiophenol are permitted to escape from the column, and recovering at least said lower boiling thiophenol in high yield.

13. The process according to claim 12 wherein an inert hydrocarbon oil is present in the reaction vessel during the cleavage reaction.

14. The process according to claim 12 wherein said catalyst is anhydrous zinc chloride.

15. The process according to claim 12 wherein t-butyl m-tolyl sulfide is cleaved and m-thiocresol is recovered in high yield.

References Cited in the file of this patent

Reid: Organic Chemistry of Bivalent Sulfur, vol. II, page 61 (1960), Chemical Pub. Co., New York, N.Y.